US012276941B2

(12) United States Patent
Hessler et al.

(10) Patent No.: US 12,276,941 B2
(45) Date of Patent: Apr. 15, 2025

(54) INERTIAL MASS EQUIPPED WITH A FLEXIBLE INERTIAL ELEMENT, PARTICULARLY FOR HOROLOGY

(71) Applicant: ETA SA MANUFACTURE HORLOGERE SUISSE, Grenchen (CH)

(72) Inventors: Thierry Hessler, St-Aubin (CH); Damien Prongue, Prêles (CH)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 333 days.

(21) Appl. No.: 17/865,878

(22) Filed: Jul. 15, 2022

(65) Prior Publication Data

US 2023/0052485 A1 Feb. 16, 2023

(30) Foreign Application Priority Data

Aug. 13, 2021 (EP) .................................... 21191261

(51) Int. Cl.
*G04B 18/00* (2006.01)
*G04B 17/06* (2006.01)

(52) U.S. Cl.
CPC ......... *G04B 18/006* (2013.01); *G04B 17/063* (2013.01)

(58) Field of Classification Search
CPC ..... G04B 18/006; G04B 17/063; G04B 17/10
See application file for complete search history.

(56) References Cited

U.S. PATENT DOCUMENTS

| | | | | |
|---|---|---|---|---|
| 965,506 A * | 7/1910 | Ecaubert | G04B 17/222 | 368/171 |
| 1,176,527 A * | 3/1916 | Ecaubert | G04B 17/222 | 368/171 |
| 1,859,866 A * | 5/1932 | Dubois | G04B 17/222 | 368/171 |
| 2003/0179655 A1* | 9/2003 | Scheufele | G04B 18/006 | 368/127 |
| 2012/0014229 A1* | 1/2012 | Mallet | G04B 18/006 | 368/170 |

(Continued)

FOREIGN PATENT DOCUMENTS

| | | |
|---|---|---|
| CH | 708 657 A1 | 4/2015 |
| CH | 709 052 B1 | 9/2019 |

(Continued)

OTHER PUBLICATIONS

European Search Report for EP 21 19 1261 dated Jan. 12, 2022.

*Primary Examiner* — Edwin A. Leon
*Assistant Examiner* — Jason M Collins
(74) *Attorney, Agent, or Firm* — Sughrue Mion, PLLC

(57) ABSTRACT

An inertial mass (1) intended to be mounted on a regulating organ (10), particularly of a horological movement, the inertial mass being configured to be subjected to a rotary oscillation movement at a predetermined frequency, the inertial mass including a rigid main body (2), characterised in that it comprises a flexible inertial element (3) assembled with the main body (2), the flexible inertial element (3) being configured to modify the geometry of the inertial mass (1) according to the oscillation amplitude. Also, a regulating organ and a horological movement comprising such an inertial mass.

20 Claims, 1 Drawing Sheet

(56) References Cited

U.S. PATENT DOCUMENTS

| | | | | |
|---|---|---|---|---|
| 2014/0241134 | A1* | 8/2014 | Niwa .................. | G04B 17/222 368/171 |
| 2016/0170374 | A1 | 6/2016 | Monferrer et al. | |
| 2019/0243308 | A1 | 8/2019 | Winkler et al. | |

FOREIGN PATENT DOCUMENTS

| | | | |
|---|---|---|---|
| FR | 1 104 040 | A | 11/1955 |
| FR | 1 128 060 | A | 1/1957 |
| FR | 1 322 923 | A | 4/1963 |
| JP | 2013-134125 | A | 7/2013 |
| JP | 5831982 | B2 | 12/2015 |
| JP | 2016-114605 | A | 6/2016 |
| JP | 2019-537015 | A | 12/2019 |
| WO | 2012/069371 | A1 | 5/2012 |

* cited by examiner

INERTIAL MASS EQUIPPED WITH A FLEXIBLE INERTIAL ELEMENT, PARTICULARLY FOR HOROLOGY

CROSS REFERENCE TO RELATED APPLICATION

This application claims priority to European Patent Application 21191261.3 filed Aug. 13, 2021, the entire contents of which are incorporated herein by reference.

TECHNICAL FIELD OF THE INVENTION

The invention relates to an inertial mass equipped with a flexible inertial element, particularly for horology.

The invention also relates to a regulating organ comprising such an inertial mass.

The invention further relates to a horological movement including such a regulating organ.

TECHNOLOGICAL BACKGROUND

Most current mechanical watches are equipped with a regulating organ and a Swiss pallet assembly escapement mechanism. The regulating organ forms the time base of the watch. It is also referred to as a resonator.

The escapement, for its part, fulfils two main functions:
- maintaining the to-and-fro motions of the resonator;
- counting these to-and-fro motions.

To form a mechanical resonator, an inertial mass, a guidance and an elastic return element are required. Conventionally, a balance-spring acts as an elastic return element for the inertial mass formed by a balance. This balance is guided in rotation by pivots rotating in smooth bearing-blocks made of ruby.

The regulating organ of mechanical watches is referred to as anisochronous because the frequency thereof is dependent on various factors such as the amplitude of the oscillations, the orientation of the watch or the temperature.

The balance-spring must generally be capable of being set to improve the precision of a watch. The horologist performs the rate setting generally with a wide amplitude and by averaging over the orientations of the watch.

For this purpose, means for adjusting the rigidity of the balance-spring are used, such as an index for modifying the effective length of the spring. Thus, the rigidity thereof is modified to adjust the rate precision of the watch. However, the effect of a conventional index for adjusting the rate remains limited, and it is not always effective in making the setting sufficiently precise, of the order of a few seconds or some tens of seconds per day.)

For a finer rate adjustment, there are adjustment means comprising one or more screws arranged in the felloe of the balance. Acting upon the screws modifies the inertia of the balance, which has the effect of modifying the rate thereof.

However, this setting mode is not easy to perform, and anyhow does not make it possible to obtain a sufficiently fine setting of the rate of the oscillator, as the adjustment is only made for a single amplitude.

SUMMARY OF THE INVENTION

The aim of the invention is that of remedying the abovementioned drawbacks, and it is intended to provide an inertial mass for a horological regulating organ.

For this purpose, the invention relates to an inertial mass intended to be mounted on a regulating organ, particularly of a horological movement, the inertial mass being configured to be subjected to a rotary oscillation movement at a predetermined frequency, the inertial mass including a rigid main body.

The inertial mass is remarkable in that it comprises at least one flexible inertial element assembled with the main body, the flexible inertial element being configured to modify the geometry of the inertial mass according to the oscillation amplitude.

By modifying the geometry of the inertial mass according to the amplitude thereof, the anisochronism slope is acted upon to retain a substantially constant frequency despite the abovementioned parasitic effects. While the inertial mass oscillates, the flexible inertial element also oscillates. The oscillation of the flexible inertial element modifies the geometry of the inertial mass according to the oscillation amplitude of the inertial mass. The oscillation amplitude of the flexible inertial element is dependent on the oscillation amplitude of the inertial mass. Thus, the geometry of the inertial mass varies according to the oscillation amplitude thereof.

Thanks to the invention, the anisochronism slope induced by the amplitude variations triggered by the orientation of the watch in relation to gravity, or by temperature differences, or by the difference in power supplied by the drive means of the movement during the discharge thereof, such as a barrel spring, is modified. Thus, the frequency remains substantially constant over time, and the precision of the regulating organ is enhanced.

According to a specific embodiment of the invention, comprises means for adjusting the position of the flexible inertial element with respect to the main body.

According to a specific embodiment of the invention, the adjustment means are configured to apply a variable force or torque on the flexible inertial element.

According to a specific embodiment of the invention comprises a second flexible inertial element arranged by rotational symmetry of the first inertial element, the adjustment means being preferably configured to adjust the position of the second flexible inertial element with respect to the main body.

According to a specific embodiment of the invention, a flexible inertial element comprises a flexible part and a rigid inertia-block, the flexible part connecting the inertia-block to the main body.

According to a specific embodiment of the invention, the flexible part comprises a first flexible strip connected to one end to the inertia-block.

According to a specific embodiment of the invention, the flexible part comprises a rigid portion connected to the other end of the first flexible strip, and comprises a second flexible strip connecting the rigid portion to the main body by the ends thereof.

According to a specific embodiment of the invention, the adjustment means comprise a longitudinally adjustable screw, the screw being configured to bear against the flexible inertial element.

According to a specific embodiment of the invention, the screw is arranged to bear against the rigid portion.

According to a specific embodiment of the invention, the main body is an annular balance, the flexible inertial element (s) being arranged inside the annular balance.

According to a specific embodiment of the invention, the inertial mass extends substantially in the same plane.

According to a specific embodiment of the invention, the inertial mass comprises at least one additional inertia-block, preferably two additional inertia-blocks, arranged on the main body, the second additional inertia-block having an adjustable position for modifying the inertia of the inertial mass.

The invention also relates to a regulating organ for a horological movement, the regulating organ comprising an elastic return element, and such an inertial mass.

The elastic return element is for example a balance-spring wherein the frequency is preferably 3 Hz, or a flexible guidance wherein the frequency is preferably at least 10 Hz.

The invention further relates to a horological movement including such a regulating organ.

BRIEF DESCRIPTION OF THE FIGURES

Further specificities and advantages will emerge clearly from the description given hereinafter, which is by way of indication and in no way limiting, with reference to the appended drawings, wherein.

DETAILED DESCRIPTION OF THE INVENTION

As explained above, the invention relates to an inertial mass 1, particularly for a horological movement, intended to be mounted on a regulating organ 10 wherein it is subjected to a rotary oscillation movement.

Figure 1:
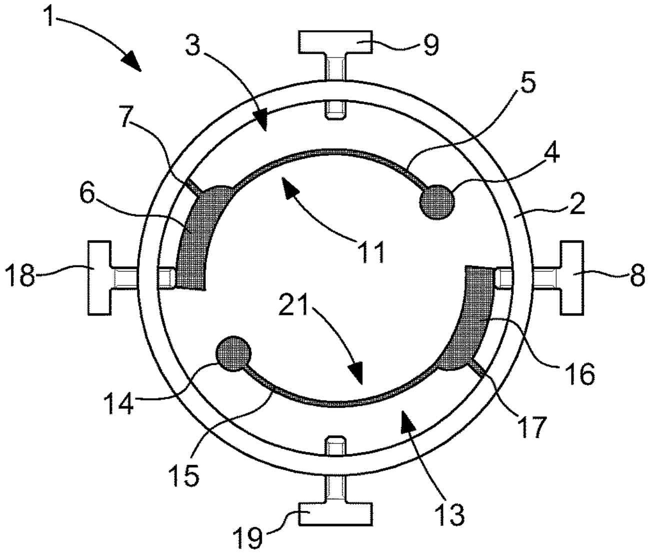
FIG. 1 is a schematic representation of an inertial mass according to the invention in a first configuration.
Figure 2:
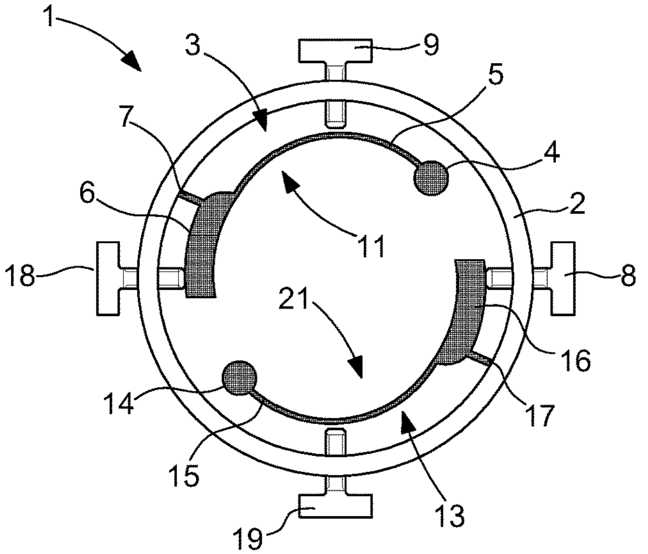
FIG. 2 is a schematic representation of the inertial mass in FIG. 1 in a second configuration.

In FIGS. 1 and 2, the inertial mass 1 extends substantially in a plane and includes a rigid main body 2. The main body 2 is for example a balance conventionally used in regulating organs. The main body 2 then has an annular, preferably circular, shape.

According to the invention, the inertial mass 1 comprises at least one flexible inertial element 3 assembled with the main body 2.

Preferably, it comprises two flexible inertial elements 3, 13 arranged symmetrically with respect to the centre of the ring inside the main body 2. Each flexible inertial element 3, 13 is assembled on the inner wall of the main body 2. Preferably, each flexible inertial element 3, 13 extends along the wall of the main body 2. The flexible inertial element 3, 13 is arranged in the same plane as the main body 2.

The two flexible inertial elements 3, 13 are configured to enable the regulating organ, equipped with this inertial mass 2, to retain a substantially constant oscillation frequency according to the amplitude of the oscillations.

Thus, the anisochronism slope induced by the amplitude variations triggered by the orientation of the watch in relation to gravity, or by temperature differences, or by the difference in power supplied by the drive means of the movement during the discharge thereof, for example a barrel spring, is modified.

Thanks to the flexible inertial elements, the frequency remains substantially constant over time. Indeed, the inertial elements 3, 13 are deformed more or less according to the amplitude and oscillation rate of the inertial mass. Thus, they influence the oscillation frequency in such a way as to keep it constant.

Each flexible inertial element 3, 13 comprises a flexible part 11, 21 and a rigid inertia-block 4, 14, the flexible part 11, 21 connecting the rigid inertia-block 4, 14 to the main body 2. The rigid inertia-block 4, 14 is heavier than the flexible part 11, 21. The rigid inertia-block 4, 14 is preferably ten times lighter than the main body 2, or at least twenty times lighter.

The flexible part 11, 21 comprises a first flexible strip 5, 15 connected by one end to the inertia-block 4, 14, as well as a rigid portion 6, 16 connected to the other end of the first flexible strip 5, 15. Furthermore, the flexible part 11, 21 comprises a second flexible strip 7, 17 connecting the rigid portion 6, 16 to the main body 2 by the ends thereof. The second flexible strip 7, 17 is smaller than the first flexible strip 5, 15.

The first flexible strip 5, 15 has the shape of an arc of a circle, and extends along the curvature of the main body 2, in a substantially parallel manner. The second flexible strip 7, 17 extends towards the inside of the ring perpendicularly to the rigid body 2 along the normal. The rigid portion 6, 16 has an arched oblong shape extending along the annular main body 2 in an opposite direction to that of the first flexible strip 5, 15. The second flexible strip 7, 17 is joined perpendicularly to a first end of the rigid portion 6, 16. The first flexible strip 5, 15 is also joined to this first end extending from the rigid portion 6, 16. Thus, the rigid portion 6, 16 includes a free second end opposite the first.

The two inertia-blocks 4, 14 are disposed symmetrically with respect to the centre of the main body 2, as well as the two rigid portions 6, 16, the two first flexible strips 5, 15, and the two second flexible strips 7, 17. Thus, each element of a flexible inertial element 3, 13 is arranged in the main body 2 by rotational symmetry with respect to the other flexible inertial element 3, 13.

When the inertial mass 1 oscillates, the inertia-blocks 4, 14 also oscillate thanks to the flexible parts 11, 21. This oscillation makes it possible to modify the inertial mass geometry according to the oscillation amplitude thereof.

Furthermore, the inertial mass 1 comprises means for adjusting the position of each flexible inertial element 3, 13 with respect to the main body 2. In particular, the adjustment means make it possible to modify the position of the inertia-blocks 4, 14 with respect to the main body 2.

For this purpose, the adjustment means are configured to apply a variable force or torque on each flexible inertial element 3, 13. In this embodiment, the adjustment means are configured to apply a variable force or torque on the rigid portion 6, 16 of the flexible part 11, 21. The variable force or torque is substantially oriented perpendicularly to the extension direction of the flexible inertial element 3, 13.

Preferably, the adjustment means comprise two longitudinally adjustable support screws 8, 18, each support screw 8, 18 being configured to bear against the flexible inertial element 3, 13, more specifically against the rigid portion 6, 16 of the flexible part 11, 21, at the free end. The two support screws 8, 18 are also arranged by rotational symmetry.

The setting screw 8, 18 passes through the main body 2 to reach the flexible inertial element 3, 13. Thus, the setting is performed by rotating the support screw 8, 18 from outside the main body 2.

By actuating the support screw 8, 18, it applies a variable force on the rigid portion 6, 16, so as to move the inertia-block 4, 14 and the first flexible strip 5, 15 with respect to the main body 2, the second flexible strip 7, 17 acting as a pivot.

Thus, the first flexible strip 5, 15 and the inertia-block 4, 14 move closer to or away from the main body 2. Consequently, the effect produced by the inertial element can be modified slightly to regulate the amplitude isochronism slope of the regulating organ 10.

In FIG. 1, the inertia-blocks 4, 14 are more distant from the main body 2, as the support screws 8, 18 apply a weaker force on the rigid portions 6, 16. On the other hand, in FIG. 2, the inertia-blocks 4, 14 are closer to the main body 2, as the support screws 8, 18 apply a greater force on the rigid portions 6, 16.

Optionally, the inertial mass comprises at least one additional inertia-block, preferably two additional inertia-blocks, arranged on the annular body, the second additional inertia-block having an adjustable position on the annular body for modifying the inertia of the inertial mass. The two inertia-blocks are for example screws 9, 19 inserted into the main body 2, and arranged by circular symmetry. By actuating the screws 9, 19 from the outside, the inertia of the inertial mass is modified. Thus, the rate or frequency of the regulating organ can be adjusted. The two inertia-blocks can also be eccentric screws.

Figure 3:
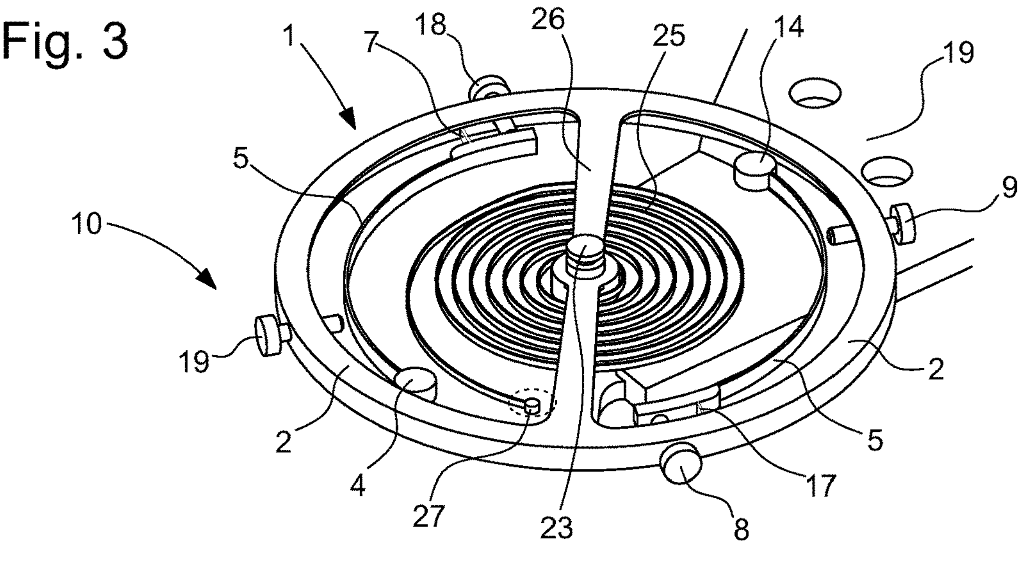
FIG. 3 is a schematic representation of a regulating organ of a horological movement, the regulating organ comprising an inertial mass according to the invention.

FIG. 3 shows a regulating organ 10 of a mechanical horological movement, the organ comprising an inertial mass 1 according to the invention, mounted on a rotary shaft 23. The regulating organ 10 is assembled on a plate 29, and it includes an elastic return element of the inertial mass 10, here a balance-spring 25 arranged parallel with the inertial mass 10. The main body 2 is equipped with a diametral arm 26 passing through the inside of the main body 2. In the middle of the diametral arm 26, a ring 24 enables assembly with the rotary shaft 23.

The balance-spring 25 comprises a strip wound onto itself, an inner end being assembled with the rotary shaft 23, and an outer end being connected to a balance-spring stud 27. The regulating organ 10 preferably has a frequency of 3 Hz.

The invention also relates to a resonator mechanism, particularly for a horological movement, not shown in the figures. The resonator mechanism is equipped with a flexible guidance according to one of the embodiments described above.

Naturally, the invention is not limited to the embodiments described with reference to the figures and alternative embodiments could be envisaged without leaving the scope of the invention. In particular, the regulating organ could comprise a flexible guidance as an elastic return element, instead of the balance-spring. The flexible guidance is for example a crossed-strip pivot. Preferably, the flexible guidance has a frequency of at least 10 Hz.

The invention claimed is:

1. An inertial mass (1) intended to be mounted on a regulating organ (10), a horological movement, the inertial mass being configured to be subjected to a rotary oscillation movement at a predetermined frequency, the inertial mass including a rigid main body (2), wherein the inertial mass comprises at least one flexible inertial element (3) assembled with the main body (2), the flexible inertial element (3) being configured to modify the geometry of the inertial mass (1) according to the oscillation amplitude, and wherein the flexible inertial element (3) is arranged radially inwards of the main body (2).

2. The inertial mass according to claim 1, further comprising means for adjusting the position of the flexible inertial element (3) with respect to the main body (2).

3. The inertial mass according to claim 2, wherein the adjustment means are configured to apply a variable force or torque on the flexible inertial element (3).

4. The inertial mass according to claim 3, further comprising a second flexible inertial element (13) arranged by rotational symmetry of the inertial element (3), the adjustment means being configured to adjust the position of the second flexible inertial element (3) with respect to the main body (2).

5. The inertial mass according to claim 2, wherein the adjustment means comprise a longitudinal adjustable screw (8, 18), the screw being configured to bear against the flexible inertial element (3, 13).

6. The inertial mass according to claim 5, wherein the screw (8, 18) is arranged to bear against the rigid portion (6, 16).

7. The inertial mass according to claim 1, wherein the flexible inertial element (3, 13) comprises a flexible part and a rigid inertia-block (4, 14), the flexible part connecting the inertia-block (4, 14) to the main body (2).

8. The inertial mass according to claim 7, wherein the flexible part comprises a first flexible strip (5, 15) connected by one end to the inertia-block (4, 14).

9. The inertial mass according to claim 8, wherein the flexible part comprises a rigid portion (6, 16) connected to the other end of the first flexible strip (5, 15), and further comprises a second flexible strip connecting the rigid portion (6, 16) to the main body (2) by the ends thereof.

10. The inertial mass according to claim 1, wherein the main body (2) is an annular balance, the flexible inertial element(s) (3, 13) being arranged inside the annular balance.

11. The inertial mass according to claim 1, wherein the inertial mass extends substantially in the same plane.

12. The inertial mass according to claim 1, further comprising two additional inertia-blocks, arranged on the main body (2), the second additional inertia-block (9, 19) having an adjustable position for modifying the inertia of the inertial mass.

13. A regulating organ for a horological movement, comprising an elastic return element, comprising an inertial mass (1) according to claim 1.

14. The regulating organ according to claim 13, wherein the elastic return element is a balance-spring (25), wherein the frequency is 3 Hz.

15. The regulating organ according to claim 13, wherein the elastic return element is a flexible guidance, wherein the frequency is at least 10 Hz.

16. A horological movement, comprising a regulating organ according to claim 13.

17. The inertial mass according to claim 1, wherein the flexible inertial element (3) is entirely arranged radially inwards of the main body (2).

18. The inertial mass according to claim 1, wherein the flexible inertial element (3) comprises an inertia-block (4), a first flexible strip (5), a rigid portion (6), and a second flexible strip (7), and wherein the inertia-block (4) is arranged at a first longitudinal end of the first flexible strip (5), wherein the rigid portion (6) is arranged at a second longitudinal end, opposite of the first longitudinal end, of the first flexible strip (5), and wherein, partway along a length of the rigid portion (6) from the second longitudinal end of the first flexible strip (5) to an end of the rigid portion (6) furthest away from the inertia-block (4), the rigid portion (6) is attached to the main body (2) by the second flexible strip (7).

19. The inertial mass according to claim 18, wherein the first flexible strip (5) and the inertia-block (4) are cantilevered away from the rigid portion (6).

20. An inertial mass (1) intended to be mounted on a regulating organ (10), of a horological movement, the inertial mass being configured to be subjected to a rotary oscillation movement at a predetermined frequency, the inertial mass including a rigid main body (2), wherein the inertial mass comprises at least one flexible inertial element (3) assembled with the main body (2), the flexible inertial element (3) being configured to modify the geometry of the inertial mass (1) according to the oscillation amplitude, wherein the flexible inertial element (3, 13) comprises a flexible part and a rigid inertia-block (4, 14), the flexible part connecting the inertia-block (4, 14) to the main body (2), wherein the flexible part comprises a first flexible strip (5, 15) connected by one end to the inertia-block (4, 14), and wherein the flexible part comprises a rigid portion (6, 16) connected to the other end of the first flexible strip (5, 15), and further comprises a second flexible strip connecting the rigid portion (6, 16) to the main body (2) by the ends thereof.

* * * * *